United States Patent [19]
Budtz et al.

[11] Patent Number: 5,523,237
[45] Date of Patent: Jun. 4, 1996

[54] PROTEIN PREPARATIONS

[75] Inventors: Peter Budtz, Frederiksberg; Per M. Nielsen, Hillerød, both of Denmark

[73] Assignee: Novo Nordisk A/S, Bagsvaerd, Denmark

[21] Appl. No.: 90,048

[22] PCT Filed: Feb. 6, 1992

[86] PCT No.: PCT/DK92/00036

§ 371 Date: Jul. 16, 1993

§ 102(e) Date: Jul. 16, 1993

[87] PCT Pub. No.: WO92/13964

PCT Pub. Date: Aug. 20, 1992

[30] Foreign Application Priority Data

Feb. 6, 1991 [DK] Denmark ................................ 199/91

[51] Int. Cl.⁶ ................ C12P 21/06; C12N 9/50; A23C 9/12
[52] U.S. Cl. ............... 435/68.1; 435/219; 435/222; 435/220; 435/221; 426/34; 426/41; 426/656; 426/657
[58] Field of Search ................. 435/68.1, 219, 435/220, 222, 221; 426/34, 41, 656, 657

[56] References Cited

U.S. PATENT DOCUMENTS

| | | | |
|---|---|---|---|
| 3,803,327 | 4/1974 | Fujimaki et al. | 426/32 |
| 3,966,985 | 6/1976 | Jonas | 426/533 |
| 4,016,147 | 4/1977 | Fujimaki et al. | 426/614 |
| 4,145,455 | 3/1979 | Fujimaki et al. | 426/614 |
| 4,266,031 | 5/1981 | Tang et al. | 435/188 |
| 4,379,177 | 4/1983 | McCoy et al. | 426/656 |
| 4,427,658 | 1/1984 | Maubois et al. | 424/177 |
| 4,452,888 | 6/1984 | Yamazaki et al. | 435/69 |
| 4,853,231 | 8/1989 | Osajima et al. | 426/7 |
| 4,940,662 | 7/1990 | Yamazaki et al. | 435/68.1 |

FOREIGN PATENT DOCUMENTS

| | | |
|---|---|---|
| 90/05462 | 5/1990 | WIPO . |
| 91/13554 | 9/1991 | WIPO . |

*Primary Examiner*—Michael G. Wityshyn
*Assistant Examiner*—L. Blaine Lankford
*Attorney, Agent, or Firm*—Steve T. Zelson; Cheryl H. Agris

[57] ABSTRACT

A plastein material is made by reversing the normal hydrolytic activity of a serine protease. The protease produces a plastein material by acting on a proteinaceous substrate. The substrate is preferably whey, casein or soy protein.

17 Claims, 8 Drawing Sheets

PROTEIN PREPARATIONS

FIELD OF INVENTION

The present invention relates to a method for increasing the viscosity of a reaction mixture, plastein materials obtained by this method, and food products comprising these plastein materials.

BACKGROUND OF THE INVENTION

Non-bitter protein preparations are obtainable by performing a reversed hydrolysis. Proteolytic enzymic reactions are reversible as are other enzymic reactions. A reversal of the enzymic degradation of peptide bonds is termed a plastein reaction, and a protein-like product synthesized by a plastein reaction is termed plastein or plastein material [vide e.g. Horowitz, J. & Haurowitz, F. (1959); Biochim. Biophys. Acta., 33, 231–237; and Determann et al. (1963); Helv. Chim. Acta., 46, 2498]. Plastein material is different from protein and may be regarded as a mixture of high molecular polypeptides. In fact Wieland et al. [Wieland, T; Determann, H. & s Albrecht, E. (1960); Ann., 633, 185 ] define plastein reaction as the formation of high molecular polypeptides.

Various microbial proteases are known to posses plastein synthetic activities. Well known proteases also known for their plastein synthetic activities are pepsin, α-chymotrypsin, trypsin, and papain [vide e.g. Fujimaki, M.; Kato, H.; Arai, S. & Yamashita, M. (1971); J. Appl. Bact. 34(1), 119–131].

At least four points are hitherto believed to be complied with for the plastein reaction to proceed effectively. First, the concentration of substrate should be high. Second, the substrate should be of low molecular weight. Third, the pH for synthesis of the plastein is different than for hydrolysis of the protein. The pH range for synthesis of plastein is narrower than the pH range for hydrolysis. Fourth, a relatively long incubation time should be applied with.

Apart from removing bitterness of hydrolysates, the plastein reaction has other food processing potentials, e.g. preparing gel-like products with excellent visco-elastic properties for incorporation in different types of foods, preparing products with improved amino acid composition using mixtures of hydrolysates as substrates, preparing products with very high level of a single amino acid which could be used as a dietary supplement to certain foods, and preparing special types of soluble peptides having important flavour or other characteristics.

SUMMARY OF THE INVENTION

The present invention provides a method for increasing the viscosity of the reaction mixture, in which an enzyme preparation comprising a proteolytic enzyme having the following characteristics:

(a) it is a serine protease specific for glutamic acid (Glu) and aspartic acid (Asp) residues;

(b) it has a specific activity of at least 25 CPU (as defined herein) per gram of enzyme protein;

(c) it has an apparent molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0;

and which enzyme preparation is substantially free from other proteolytic activity, is added to a proteinaceous substrate allowing a plastein reaction, followed by incubation at conditions at which increased viscosity occurs, and subsequent inactivation of the enzyme.

In its second aspect the invention provides plastein materials obtained by adding to a proteinaceous material an enzyme preparation comprising a proteolytic enzyme having the following characteristics:

(a) it is a serine protease specific for glutamic acid (Glu) and aspartic acid (Asp) residues;

(b) it has a specific activity of at least 25 CPU (as defined herein) per gram of enzyme protein;

(c) it has an apparent molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0;

and which enzyme preparation is substantially free from other proteolytic activity, followed by incubation and subsequent inactivation of the enzyme.

In its third aspect the invention provides food products comprising plastein material of the invention.

The proteolytic enzyme defined above has previously been characterized in U.S. Pat. No. 4,266,031 as a contaminant of subtilisin A produced by Bacillus licheniformis. In this specification, however, the enzyme was wrongly characterised as a non-serine protease. Later investigations on this subject have now revealed that the enzyme is in fact inhibited by diisopropyl phosphofluoridate (DFP), and is therefore a serine protease.

Furthermore, there is no indication of the specific proteolytic activity of the enzyme in the above-mentioned US patent, and its utility for use in a process of the invention for increasing the viscosity of the reaction mixture is therefore not anticipated by the disclosure of the enzyme per se in this patent.

In International Patent Application No. WO 91/13554 it has been found that the proteolytic enzyme defined above provides for limited and specific hydrolysis of proteins at Glu and/or Asp residues, and the application, therefore, relates to the use of the enzyme in a method for hydrolysis of proteins.

Now it has surprisingly been found that the proteolytic enzyme defined above possesses excellent plastein synthetic activities, particularly when applied to whey protein, which enables this protease to exert increased viscosity of the reaction mixture, even at moderate conditions.

BRIEF DESCRIPTION OF DRAWINGS

The present invention is further illustrated by reference to the accompanying drawings, in which.

DETAILED DISCLOSURE OF THE INVENTION

The present invention relates to the use of specific proteolytic enzymes for plastein synthesis, i.e. a process for increasing the viscosity of the reaction mixture.

Accordingly, the invention provides a method for increasing the viscosity of the reaction mixture, in which an enzyme preparation comprising a proteolytic enzyme having the following characteristics:

(a) it is a serine protease specific for glutamic acid (Glu) and aspartic acid (Asp) residues;

(b) it has a specific activity of at least 25 CPU (as defined herein) per gram of enzyme protein;

(c) it has an apparent molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0;

which enzyme preparation is substantially free from other proteolytic activity, is added to a proteinaceous substrate allowing a plastein reaction, followed by incubation at conditions which cause increased viscosity, and subsequent inactivation of the enzyme.

The Enzyme

The proteolytic enzyme employed in the present method may be one producable by a microorganism, in particular a bacterium. Such a bacterium may be a strain of *Bacillus licheniformis*, e.g. a strain known to produce subtilisin A as well as another protease corresponding to the proteolytic enzyme defined above. In this case, the proteolytic enzyme may be prepared by culturing the bacterial strain under conditions conducive to the production of alkaline protease which may then be isolated, after which the protease activities may be separated by methods known per se, e.g. by the process described in the above-mentioned U.S. Pat. No. 4,266,031.

The strain of *Bacillus licheniformis* may also be a mutant strain, such as a mutant in which the gene encoding subtilisin A has been inactivated, for instance by conventional mutagenesis procedures involving the use of a mutagen such as nitrosoguanidine, e.g. substantially by the procedure disclosed in the abovementioned U.S. Pat. No. 4,266,031 (disclosing the inactivation of the gene encoding the proteolytic enzyme of current interest). Alternatively, the inactivation of the subtilisin A gene may also take place by recombinant DNA techniques, e.g. by inserting one or more nucleotides into the subtilisin A gene so as to disrupt the sequence. This may for instance be done by homologous recombination, e.g. as described by Ferrari et al., J. Bacteriol. 154(3), 1983, pp. 1513–1515. The proteolytic enzyme may also be produced by isolating the DNA sequence from a cDNA or genomic library of microorganism producing the enzyme, e.g. a strain of *Bacillus licheniformis*, inserting the DNA sequence into a suitable expression vector, transforming a suitable host microorganism with the vector, growing the host under conditions which are conducive to the production of the enzyme and recovering the enzyme from the culture. These steps may be carried out by standard procedures, cf. Maniatis et al., Molecular Cloning: A Laboratory Manual, Cold Spring Harbor, 1982.

In a particular embodiment of the present process, the proteolytic enzyme is one which has the amino acid sequence ID No. 1 shown in the appended sequence listing, or a derivative thereof.

In the present context, the term "derivative" is understood to indicate a proteolytic enzyme which is derived from the native enzyme by addition of one or more amino acids to either or both the C- and N-terminal end of the native protein, substitution of one or more amino acids at one or a number of different sites in the native amino acid sequence, deletion of one or more amino acids at either or both ends of the native protein or at one or more sites in the amino acid sequence, or insertion of one or more amino acids at one or more sites in the native amino acid sequence, provided that the proteolytic activity of the enzyme is not thereby impaired.

In the context of this invention, proteolytic activity is expressed in terms of casein protease units (CPU), cf. Example 1 for definition.

The enzyme may be added to the proteinaceous material in a concentration in the range 0.05–50 CPU/100 g protein, more preferably 0.1–25 CPU/100 g protein, most preferably 1–25 CPU/100 g protein.

The Substrate

The proteinaceous material, which may advantageously be subjected to a method of the invention, may be any of the proteins or proteinaceous materials suggested for hydrolysis in the prior literature. Examples of suitable proteinaceous materials are animal proteins such as whey protein, casein, meat proteins, fish protein, red blood cells, egg white or gelatin, or vegetable proteins such as soy protein, grain proteins, e.g. wheat gluten or zein, rape seed protein, alfalfa protein, pea protein, fabaceous bean protein, cotton seed protein or sesame seed protein, or a combination hereof.

In a specific embodiment, the proteinaceous material is casein, soy protein, or whey protein, or a proteinaceous mixture comprising one or more of these proteins.

Preferably the proteinaceous material is whey protein, or a proteinaceous mixture comprising whey protein.

During incubation, the substrate concentration may be within the range 5–50% (w/w), more preferably 5–30% (w/w), most preferably 5–15% (w/w).

Incubation Conditions

During incubation, reaction conditions that make allowance for optimum plastein synthetic activities should be observed. In contrast to other plastein reactions known, the method of the invention may be performed at moderate conditions.

The method may be performed at an incubation temperature within the range 20°–70° C., preferably 45°–65° C.

The incubation may be performed at a pH within the range 4–12, more preferred 6–9, most preferred around pH 8.

The incubation time may be in the range 0.5–24 hours, more preferred 1–10 hours, most preferred 1–5 hours.

For preparation of products with improved amino acid composition, or products with very high level of a single amino acid, the substrate may be a mixture of hydrolysates, or the substrate may be added one or more single amino acid(s).

In accordance with established practice, the proteolytic enzyme may suitably be inactivated by increasing the temperature of the incubation mixture to above about 70° C., preferably 85° C. for approximately 3 minutes, or by decreasing the pH of the incubation mixture to below about 5.0.

Plastein Materials

In another aspect, the invention relates to protein preparations obtained by the method of invention. Accordingly, the invention provides plastein materials obtained by adding to a proteinaceous material an enzyme preparation comprising a proteolytic enzyme having the following characteristics:

(a) it is a serine protease specific for glutamic acid (Glu) and aspartic acid (Asp) residues;

(b) it has a specific activity of at least 25 CPU (as defined herein) per gram of enzyme protein;

(c) it has an apparent molecular weight of about 23,600;

(d) it is inhibited by diisopropyl phosphofluoridate, but not by phenylmethane sulfonylfluoride;

(e) it exhibits 75% or more of its maximum activity in the pH range of 6.5–10.0;

which enzyme preparation is substantially free from other proteolytic activity, followed by incubation and subsequent inactivation of the enzyme.

In a more specific aspect, the plastein material is obtained from casein, soy protein, or whey protein, or a proteinaceous mixture comprising one or more of these proteins.

Preferably, the plastein material is obtained from whey protein, or proteinaceous mixtures comprising whey protein.

In another specific aspect, the plastein material has a molecular weight not exceeding approximately 7,000.

In a further specific aspect, the plastein material has a dry matter composition essentially similar to that of the starting material (the substrate).

In a yet further aspect, the plastein material has a viscosity at 50° C. of more than 40 mPa*s, preferably more than 60 mPa*s, most preferred more than 80 mPa*s, as determined by a HAAKE VT 181 viscosimeter with NV sensor and spindle No. 4.

For preparation of plastein material with improved amino acid composition, or plastein material with very high level of a single amino acid, the substrate may be a mixture of hydrolysates, or the substrate may be added one or more of the desired single amino acid(s). By enriching the amino acid composition food products of increased nutrient value may be obtained.

The plastein material of the invention possesses excellent emulsifying capacity. Generally, increased viscosity leads to more stable emulsions. However, increased viscosity not always leads to improved emulsifying capacity, as is the case with plastein material of this invention.

High molecular compounds are associated with an increased risk of allergenicity. Therefore, an increased degree of hydrolysis generally leads to less allergenic products. As evident from FIG. 7, the plastein material described has a very specific molecular weight distribution. The plastein material does not contain peptides having a molecular weight exceeding approximately 7,000. Hence, the plastein material possesses reduced risk of allergenicity, which allows for implementation into particular mother milk substitutes.

Moreover, the plastein material of the invention is neutral in respect to taste, which also allows for implementation into various food products, e.g. emulsified meat products, low fat spreads, or mother milk substitutes.

Food Products in a further aspect, the invention relates to food products comprising plastein material obtained by the method of the invention.

Advantageously, the plastein material of the invention may be implemented in the manufacture of e.g. gel-like products with special visco-elastic properties for incorporation in different types of foods, such as emulsified meat products, low fat spreads, whipped toppings and desserts, products with especially designed nutritive values, e.g. due to improved amino acid compositions or increased levels of single amino acids, which could be used as a dietary supplement to certain foods, products containing special types of soluble peptides having important flavour or other characteristics, etc.

In a preferred embodiment, the plastein material of the invention may be incorporated into mother milk substitute,.

The amount of plastein material incorporated in the food product will typically be in the range of 1–30% (w/w). The food product may comprise fat and/or carbohydrates, and may further comprise usual food additives, such as flavouring agents, sweeteners, vitamins, minerals and trace elements.

The invention is further illustrated in the following examples, which are not intended to be in any way limiting to the scope of the invention as claimed.

Characterization of *Bacillus licheniformis* SP 446 protease

Yield of SP 446 protease

Alcalase™ PPA 1618 was purified as described in U.S. Pat. No. 4,266,031. The yield of purified SP 446 protease was determined by measuring the enzymatic activity of the starting and purified SP 446 protease using CBZ-Phe-Leu-Glu-pNA (Boehringer Mannheim) as substrate. It was necessary to add phenylmethane sulfonylfluoride (1:10 vol) in order to inactivate subtilisin A present in the enzyme preparation, as subtilisin A is able to degrade the substrate, apparently by cleaving after Phe or Leu. The enzymatic activity of the starting material (40 ml) was measured in a Perkin-Elmer Lambda reader as the absorbance at 405 nm/min./ml and was determined to be 166,920. The enzymatic activity of the purified material (31 ml) was similarly measured and determined to be 158,720. Thus, the yield of SP 446 protease was 95%.

Proteolytic activity

The proteolytic activity of the SP 446 protease was determined to be 27 CPU/g using casein as substrate. 1 casein protease unit (CPU) is defined as the amount of enzyme liberating 1 millimole of primary amino groups (determined by comparison with a serine standard) per minute under standard conditions as described below:

A 2% (w/v) solution of casein (Hammarsten®, supplied by Merck AG, Darmstadt, FRG) is prepared with the Universal Buffer described by Britton and Robinson, *J. Chem. Soc.*, 1931, p. 1451), adjusted to a pH of 9.5. 2 ml of the substrate solution are pre-incubated in a water bath for 10 min. at 25° C. 1 ml of an enzyme solution containing b g/ml of the enzyme preparation, corresponding to about 0.2–0.3 CPU/ml of the Universal Buffer (pH 9.5) is added. After 30 min. of incubation at 25° C., the reaction is terminated by the addition of a quenching agent (5 ml of a solution containing 17.9 g of trichloroacetic acid, 29.9 g of sodium acetate and 19.8 g of acetic acid made up to 500 ml with deionized water). A blank is prepared in the same way as the test solution with the exception that the quenching agent is added prior to the enzyme solution. The reaction mixtures are kept for 20 min. in a water bath after which they are filtered through Whatman 42 paper filters. A folder AF 228/1 describing this analytical method is available upon request from Novo Nordisk A/S, Denmark.

Primary amino groups are determined by their colour development with o-phthaldialdehyde (OPA), as follows:

7.62 g of disodium tetraborate decahydrate and 2.0 g of sodium dodecylsulfate are dissolved in 150 ml of water. 160 mg of OPA dissolved in 4 ml of methanol were then added together with 400 µl of β-mercaptoethanol after which the solution is made up to 200 ml with water. To 3 ml of the OPA reagent are added 400 µl of the flitrates obtained above, with mixing. The optical density (OD) at 340 nm is measured after about 5 min. The OPA test is also performed with a serine standard containing 10 mg of serine in 100 ml of Universal Buffer (pH 9.5). The buffer alone is used as a blank. The protease activity is calculated from the OD measurements by means of the following formula:

$$CPU/\text{ml enzyme solution:} \frac{(OD_t - OD_b) \times C_{ser} \times Q}{(OD_{ser} - OD_B) \times MW_{ser} \times t_i}$$

wherein $OD_t$, $OD_b$, $OD_{ser}$, and $OD_B$ are the optical densities of the test solution, blank, serine standard, and buffer, respectively, $C_{ser}$ is the concentration of serine (mg/ml) in the standard (in this case 0.1 mg/ml), and $MW_{ser}$ is the molecular weight of serine (105.09). Q is the dilution factor for the enzyme solution (in this case 8) and $t_i$, is the incubation time in minutes (in this case 30 minutes).

pH Activity

Figure 1:
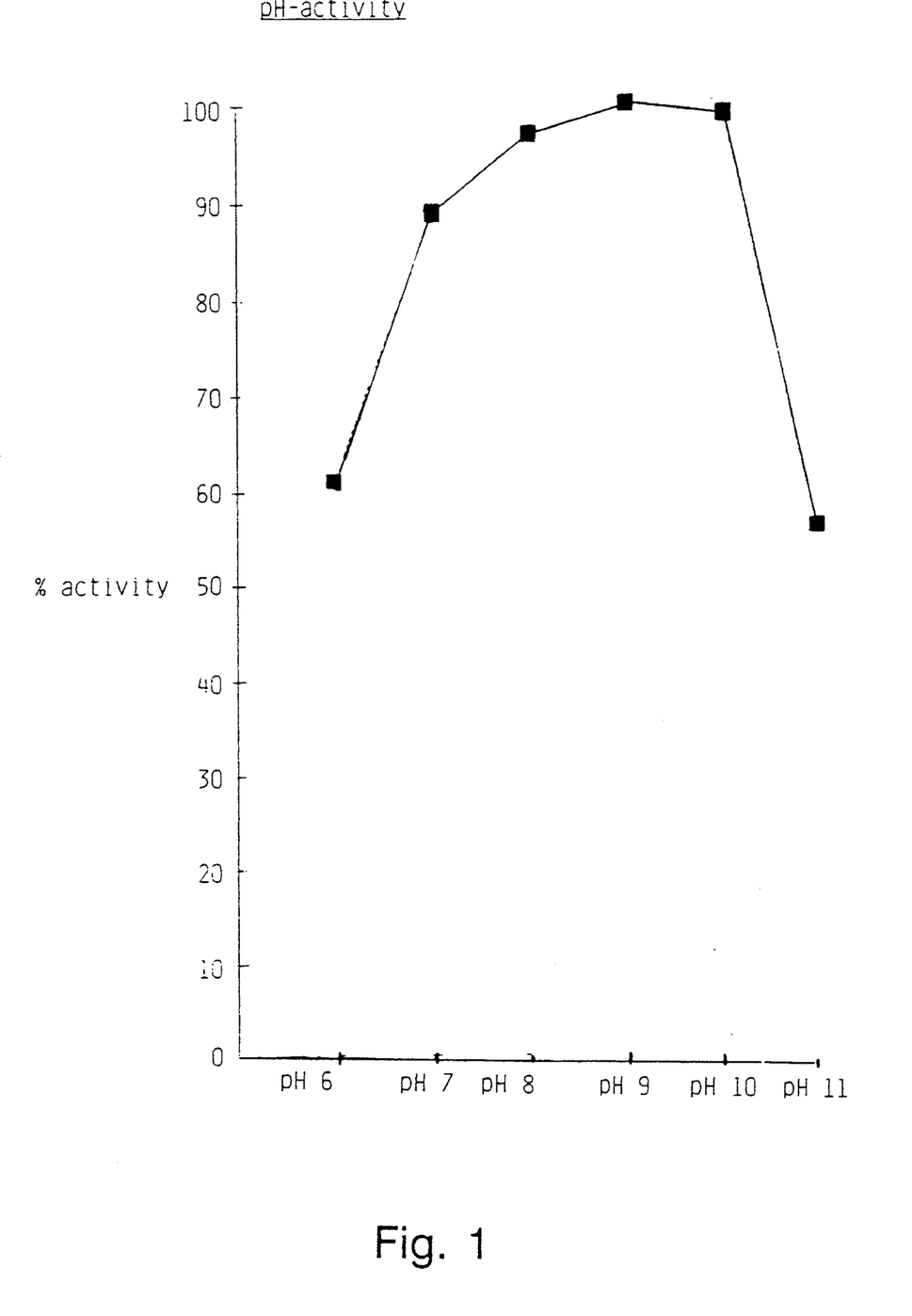
FIG. 1 is a graph showing the activity (% rel.) in relation to pH (pH 6–11) of the SP 446 protease of the invention.

The pH dependence of the activity of the SP 446 protease was determined by the OPA casein method described above with the modification that the Universal Buffer was adjusted to different pH values, i.e. pH 6, 7, 8, 9, 10 and 11. The results are shown in FIG. 1 from which it appears that the SP 446 protease has a pH optimum in the range of pH 8–10.

Temperature activity

Figure 2:
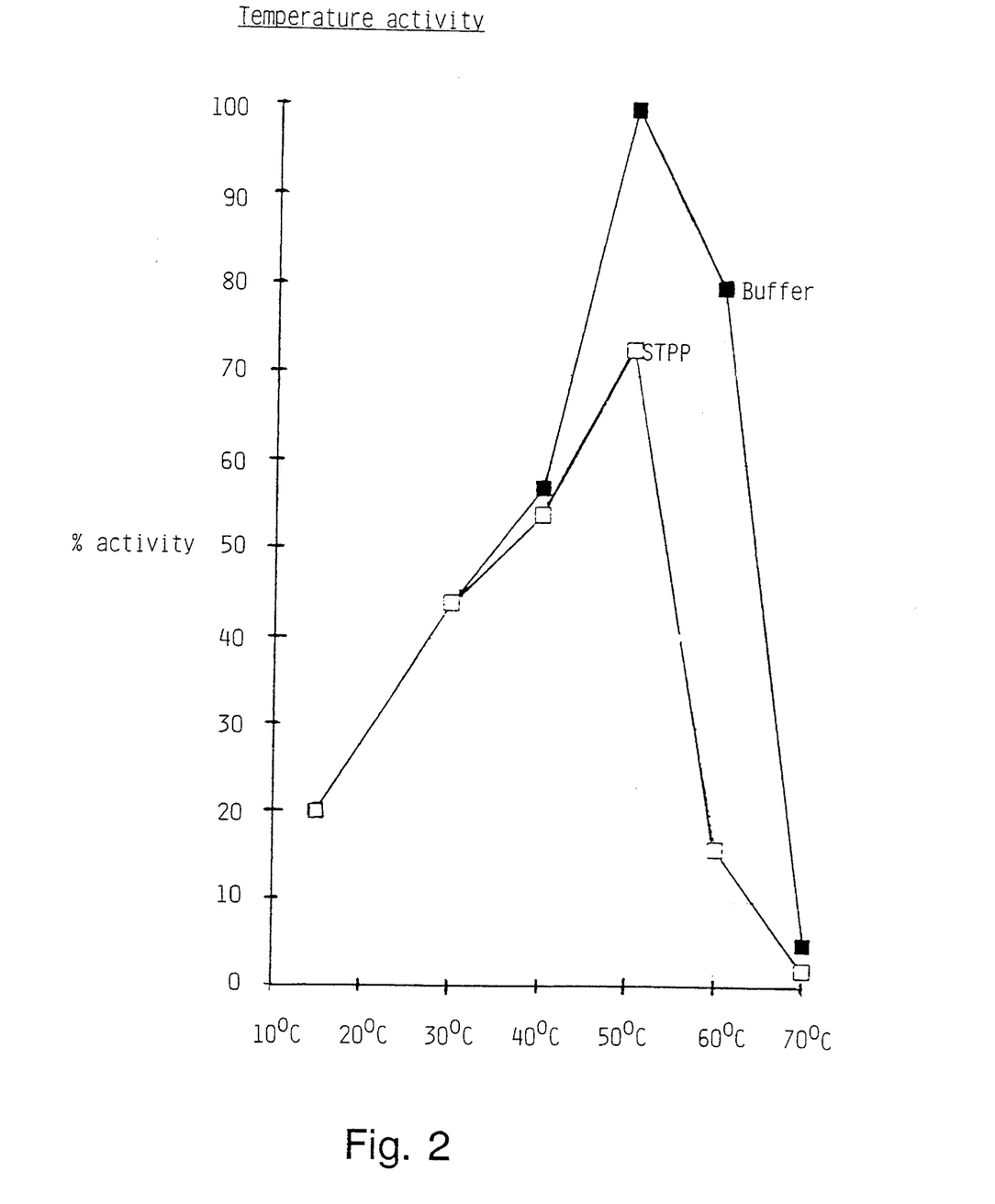
FIG. 2 is a graph showing the activity (% rel.) in relation to temperature (15°–70° C.) of the SP 446 protease of the invention in the presence (white squares) and absence (black squares) of sodium tripolyphosphate (STPP)

The temperature dependence of the activity of the SP 446 protease was determined by the OPA casein method described above with the modifications that the enzyme reaction was carried out at different temperatures, i.e. 15° C., 30° C., 40° C., 50° C., 60° C. and 70° C., and that the enzyme reaction was conducted in the presence and absence of 0.1% sodium tripolyphosphate (STPP) which is a common ingredient in many commercial detergents. The results are shown in FIG. 2 from which it appears that the SP 446 protease has a temperature optimum of about 50° C. whether STPP is present or not.

Glu specificity

The Glu specificity of the SP 446 protease was determined as follows:

0.5 ml of 1 mg/ml human insulin in Universal Buffer, pH 9.5 (vide supra), and 75 µl 446 protease (0.6 CPU/l) in the same buffer were incubated for 120 min. at 37° C. The reaction was terminated by adding 50 µl 1N hydrochloric acid.

Figure 3:
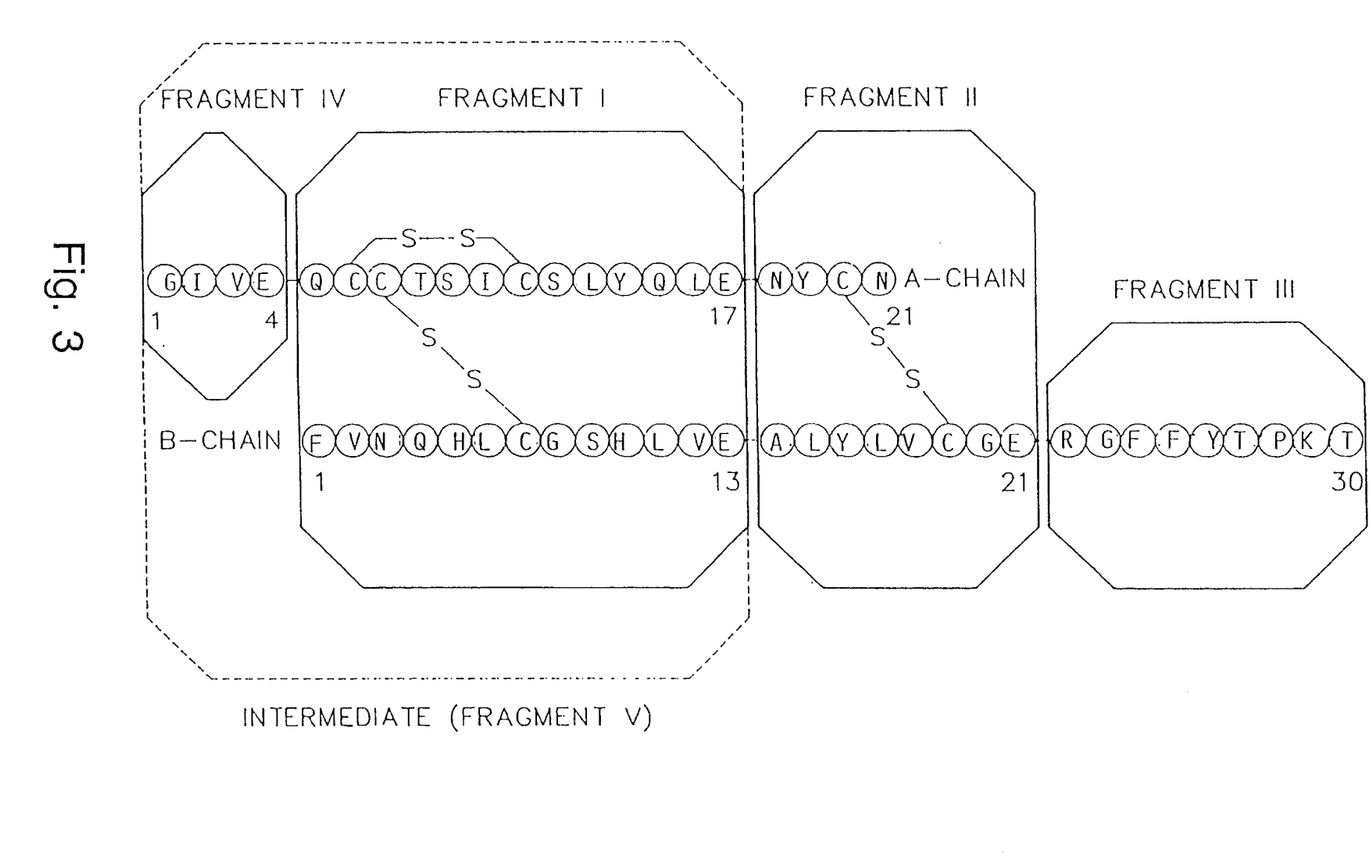
FIG. 3 shows the cleavage of insulin by the SP 446 protease.

The insulin molecule was cleaved into a number of peptide fragments. These were separated and isolated by reverse phase HPLC using a suitable C-18 column (Hibar LiChrosorb RP-18,5 µm particles provided by Merck AG, Darmstadt, FRG). The fragments were eluted with the following solvents:

A. 0.2M sodium sulfate and 0.1M phosphoric acid; pH 2.5;

B. Acetonitrile/water, 50%; on a linear gradient of from 90% A/10% B to 80% A/20% B for 0–5 min. and subsequently for 50 min. with 80% A/20% B. The isolated fragments were subjected to amino acid sequencing by automated Edman degradation, using an Applied Biosystems (Foster City, Calif., USA) Model 470A gas-phase sequencer, and the phenylthiohydantoin (PTH-) amino acids were analyzed by high performance liquid chromatography as described by Thim et al., "Secretion of human insulin by a transformed yeast cell", FEBS Letters 212(2), 1987, p.307. The cleavage sites in the insulin molecule were identified as shown in FIG. 3.

N-terminal amino acid sequence

The N-terminal amino acid sequence of the purified SP 446 protease was determined as described in the foregoing section. The N-terminal sequence was determined to be SEQ ID No: 2.

Complete amino acid sequence

The complete amino acid sequence was determined from the DNA sequence. The DNA sequence was determined by standard techniques as described in the section entitled "Detailed Disclosure Of The Invention". The complete amino acid sequence is SEQ ID No: 1 shown in the appended sequence listing.

Based on this amino acid sequence, the molecular weight of the SP 446 protease was determined to be 23,600.

Inactivation of the SP 446 protease with DFP

Incubation of the enzyme with PMSF (1% in isopropanol) in a ratio of 1 to 10 (by volume) did not result in any inactivation of the SP 446 protease. However, incubation of 10 µl (1 mg/ml) of the enzyme with 80 µl 10 mM MOPS, pH 7.2,+10 µl 0.1M diisopropyl phosphofluoridate (DFP) for 60 min. resulted in complete inactivation of the enzyme as measured by its activity on the substrate CBZ-Phe-Leu-Glu-pNA.

EXAMPLE 2

Preparation of high viscosity whey protein

The increase in viscosity was investigated in relation to the degree of hydrolysis (DH).

As substrate spray-dried whey protein concentrate (Lacprodan-80, available from Danmark Protein A/S, Nr. Vium, 6920 Videbaek, Denmark) was used. The protein concentration was 8.0% (w/w), and the SP 446 protease dosage was 5 CPU/100 g protein. The incubation was performed at 65° C. in a pH stat at pH 8.0, adjusted with NaOH.

The viscosity was monitored at 50° C. using a HAAKE VT 181 viscosimeter with NV sensor and spindle No. 4.

Figure 4:
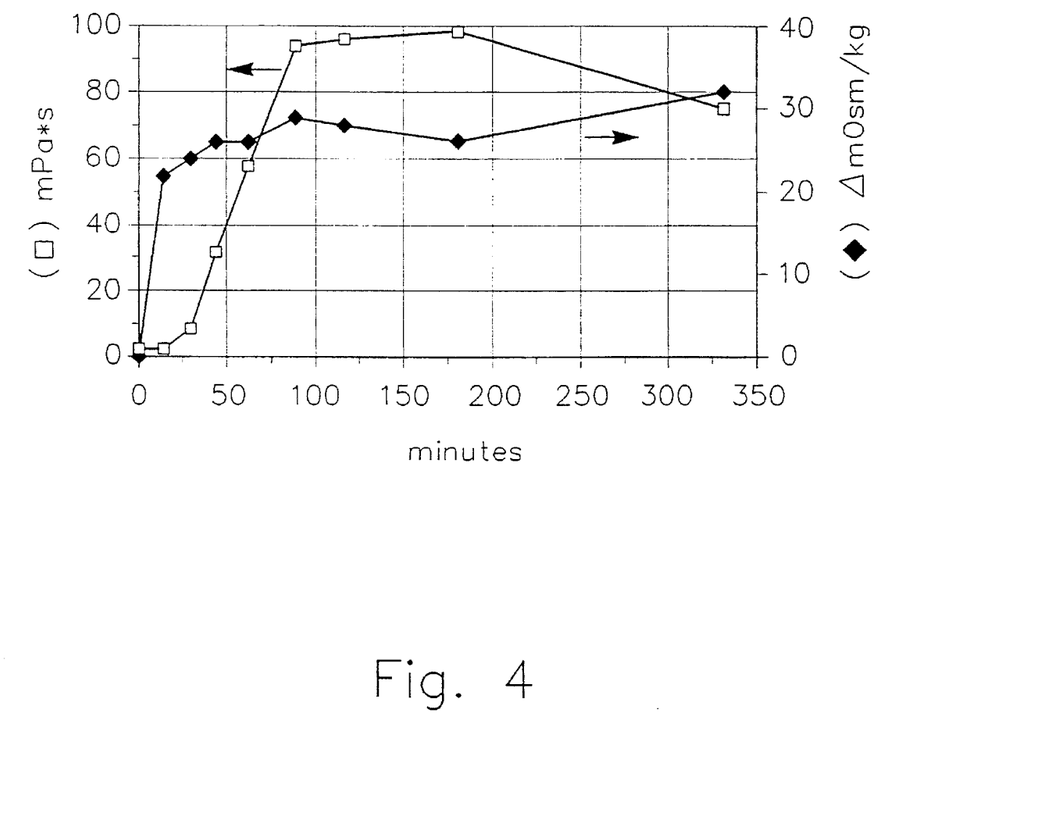
FIG. 4 shows the viscosity and Δ osmolality during incubation of whey protein isolate with SP 446 protease of the invention (□=mPa*s; ♦=ΔmOsm/kg)

The result of this test is presented in FIG. 4. It appears from this figure that maximum viscosity was obtained after 3 hours of incubation. Interestingly, at this point also a local minimum in osmolality appears.

From the base consumption the degree of hydrolysis was calculated according to Adler-Nissen; Enzymic Hydrolysis of Food Proteins; Elsevier Applied Science Publishers Ltd. (1961), p. 122.

The degree of hydrolysis may be calculated by means of the following formula:

$$DH = \frac{\text{Number of peptide bonds cleaved}}{\text{Total number of peptide bonds}} \times 100$$

The total number of peptide bonds in a protein may be calculated from its amino acid composition. The number of peptide bonds cleaved may be determined from an assay of the free Ó-amino groups in the hydrolysate by the following method using trinitrobenzene sulphonic acid (TNBS):

0.25 ml of a sample containing between $0.25 \times 10^{-3}$ and $2.5 \times 10^{-3}$ amino equivalents/l is mixed in a test tube with 2.00 ml phosphate buffer at pH 8.2. 2 ml of a 0.1% TNBS solution is added and the test tube is shaken and placed in a water bath at 50°±1° C. for 60 min. During incubation, the test tube and water bath are covered with aluminium foil because the blank reaction is accelerated by exposure to light. After 60 min., 4.00 ml HCl are added to terminate the reaction, and the test tube is allowed to stand at room temperature for 30 min. before reading the absorbance spectrophotometrically against water at 340 nm. For further details, see Adler-Nissen, J. Agric. Food Chem. 27, 1979, p. 1256–1262.

Figure 5:
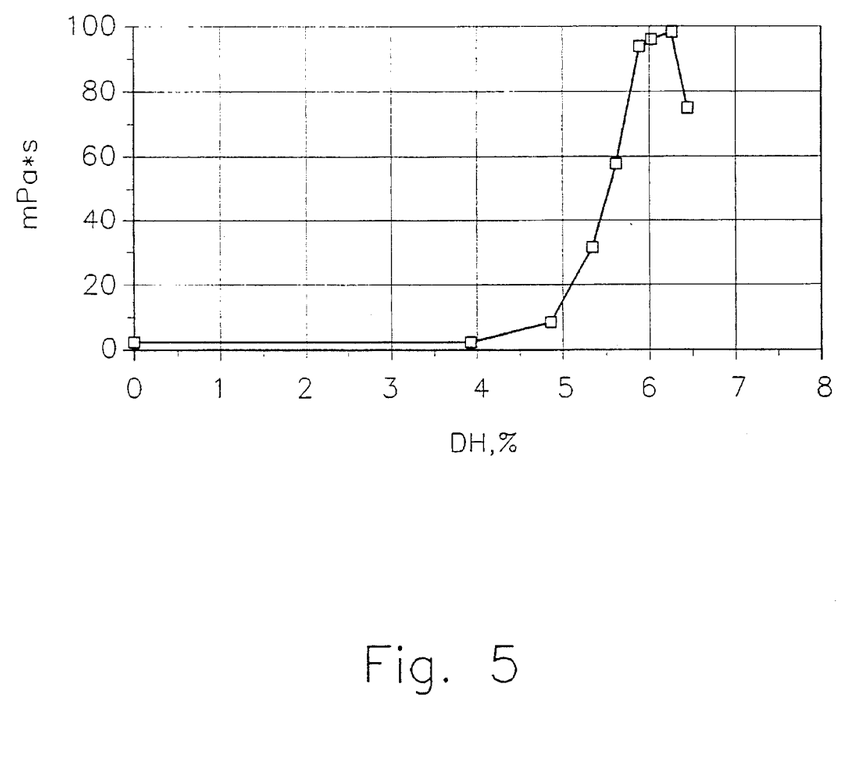
FIG. 5 shows the viscosity (mPa*s) in relation to degree of hydrolysis (% DH), during incubation of whey protein isolate with SP 446 protease of the invention.

FIG. 5 presents the viscosity in relation to DH. Clearly, the product shows maximum viscosity at a DH of approximately 6%. The taste of this product was evaluated, and it was found to be excellent, non-bitter, with possibilities for implementation into food or nutrient products.

EXAMPLE 3

Emulsifying Properties

The emulsifying capacity of the high viscosity product of the invention was examined.

Samples of the high viscosity product obtained according to Ex. 2, having a DH of 2%, 4% and 6%, respectively. The incubation was terminated by heat treatment at 85° C. for 3 minutes at the desired DH. The samples were subjected to analysis and compared to the raw material by two different test methods, a Swift titration method as described by Swift et al.; Food Technology (1961), 15, p.468–473, and a model food system similar to a mother milk substitute.

The Swift titration was used with slight modifications.

1.25 g of protein obtained according to Ex. 2 (N×6.38) were dispersed at low speed for two minutes using 250 ml of 0.5M NaCl. 50 ml were transferred to a blender jar and weighed. 50 ml of soy bean oil were added and the oil-water mixture was subjected to high-speed cutting and mixing (approximately 13,000 rpm) with a MSE Homogenizer.

The blender jar was cooled in an ice bath. During this mixing a steady flow of oil was added from a separating funnel at a rate of 0.3 ml per second (The rate of oil addition has an effect on the emulsifying capacity). Oil was added until the emulsion formed resisted mixing. Then the position of the blades of the homogenizer was changed in order to secure the absorption of fresh oil. This thickening indicates that the "end point" is about to be reached.

Addition of oil was immediately terminated when a sudden decrease in viscosity was observed visually. This indicates that the emulsion had collapsed from an oil/water emulsion to a water/oil emulsion. The total amount of oil added before the "end point" was found by weighing the blender jar.

Emulsifying capacity was calculated as g oil per gram protein (N×6.38).

The emulsifying capacity was measured five times for each product to calculate an average capacity.

The result of this test is presented in Table 1.

TABLE 1

| Emulsifying capacity | |
| --- | --- |
| Raw material | 231 g oil/g protein |
| DH = 2% | 467 g oil/g protein |
| DH = 4% | 455 g oil/g protein |
| DH = 6% | 507 g oil/g protein |

In the second method, the emulsifying properties were examined in a model food system for a liquid mother milk substitute product of the following composition:

| | |
| --- | --- |
| Protein/protein hydrolysate (appr. 80% protein dry substance) | 2.0% |
| Maltodextrin DE 8-10 (CPC-1908) | 3.5% |
| Sucrose | 3.5% |
| Oil (soy) | 3.5% |
| Water | 87.5% |

The protein/protein hydrolysate, maltodextrin and sucrose were dissolved in water and heated to approximately 70° C. The oil was heated to approximately 70° C. Using a Silverson-mixer the water-phase was mixed, and during mixing oil was added to obtain a pre-emulsification by mixing for 2 minutes.

The mixture was homogenised using a Rannie Homogenizer at approximately 70° C. and 300 bar, before the emulsion was heat-treated at 85° C. for 3 minutes and then cooled to below 20° C. Samples were stored cold, below 5° C.

After 1 and 7 days of storage, the emulsions are judged visually. If the samples are inhomogen, or free fat is on the surface, the emulsifying capacity is poor.

Moreover, after 1 and 7 days of storage, the emulsions are centrifuged at 15,000 xg for 15 minutes and judged visually. If samples are inhomogen, or free fat is on the surface, the emulsifying capacity is poor.

In this experiment, no free fat on the surface of any of the samples was observed, indicating stable emulsions with an excellent emulsifying capacity.

EXAMPLE 4 preparation of high viscosity soy protein 4000 ml of a suspension of soy protein isolate (Purina 500E, Protein Technology Int., USA), which suspension contained about 8% protein (N×6.25) were subjected to incubation with SP 446 protease (1% of the 27 CPU/g enzyme), at a pH of 8.0 and a temperature of 65° C.

During incubation, which was monitored by means of a pH-stat (Radiometer, Copenhagen, Denmark), the pH was kept constant by addition of 4N NaOH. The reaction was monitored by base consumption, viscosity and osmolality.

Figure 6:
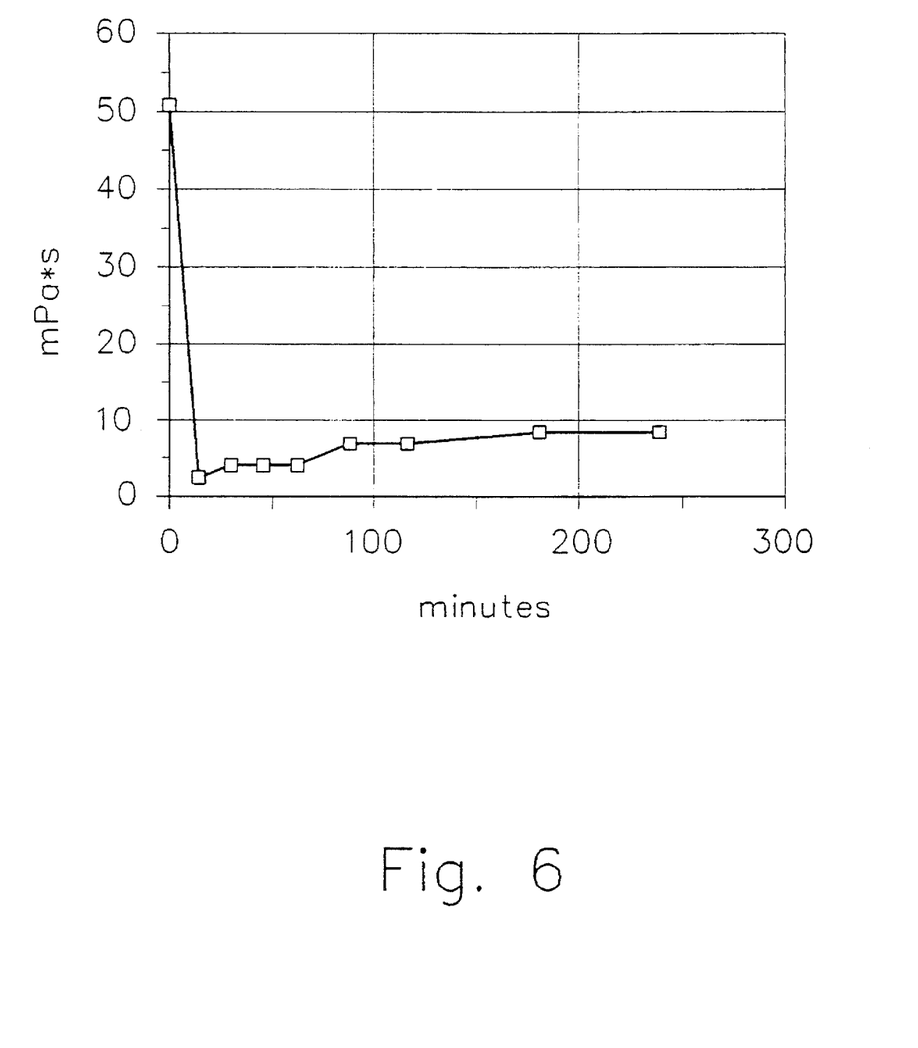
FIG. 6 shows the viscosity (mPa*s) during incubation of soy protein with SP 446.

The result of this preparation is presented on FIG. 6. A local viscosity maximum is noticed after 180 minutes of reaction, similar to incubation on whey protein. However, the viscosity at this point is far from the starting value indicating a very limited plastein synthetic activity on soy protein.

EXAMPLE 5

Molecular Weight Distribution

A sample of the incubated whey protein obtained according to Ex. 2 was diluted, filtrated and injected into a liquid chromatographic system, operating in the Gel Permeation Chromatography (GPC) mode.

This separation technique utilizes a liquid flow through a column filled with porous particles, having pores with a well-defined pore diameter. When a solution of peptides having different molecular size passes through the column, the small peptides will be able to flow into the pores while the larger peptides will be excluded from the pores. Thus, the peptides in a solution will be separated according to molecular size (and weight), as the larger peptides will be eluted faster from the column than the smaller peptides.

A detector at the column outlet continuously measures the effluent. The chromatographic system is calibrated with peptides with known molecular weight.

Chromatographic equipment

The HPLC system consisted of a High Pressure pump, Waters M 510, at a flow rate of 0.7 ml/min. The injector was a Waters WISP M 710, and the detector a Waters M 440 with wavelength extension to 214 nm.

Three GCP columns, TSK G 2000 SWXL, 7.8 mm ×300 mm, were connected in series and operated at ambient temperature.

Integration/data processing were performed on a Waters 820MAXIMA SIM chromatography data system with 810/820 GPC option.

As mobile phase a mixture of 0.05M phosphate buffer and 0.5M ammoniumchloride solution containing 0.1% trifluoroacetic acid and 25% acetonitrile was used.

Calibration

The chromatographic system was calibrated by means of injections of numerous peptide standards with known molecular weight. The molecular weight of each standard is plotted semilogarithmically versus the observed volume of phase needed to eluate the peptide from the column. By a least squares calculation, the best fitting 3'd order polynomium was calculated. This curve represents the calibration curve.

Analysis

The sample was diluted/dissolved in mobile phase to approximately 5 mg/ml. The solution was filtered through 22 µm filter and 20 µl were used for injection into the chromatograph. The detector response versus elution volume was recorded.

The recorded curve, the chromatogram, shows the actual molecular weight distribution of the sample. To allow for calculations as to accumulated weight distribution and average molecular weight calculations, the chromatogram was divided into small time (and elution volume) segments, each segment characterized by the elution volume and the area of the chromatogram over the time interval.

Calculation

Figure 7:
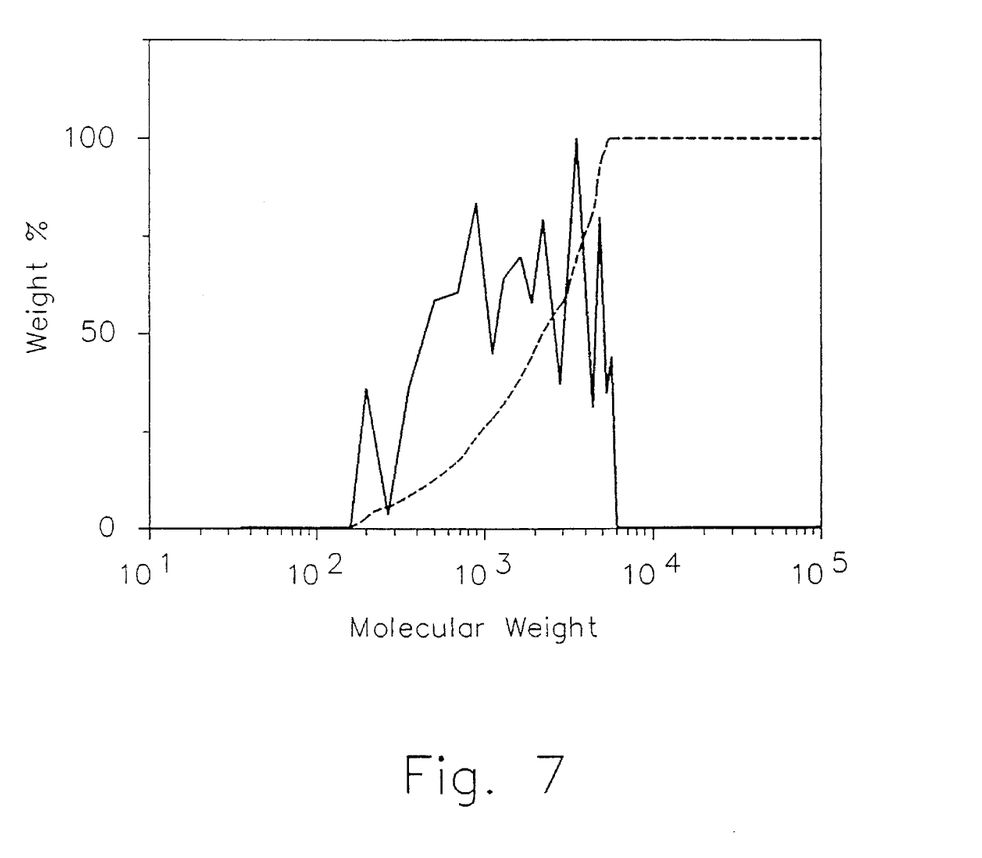
FIG. 7 shows the molecular weight distribution of plastein material (6% DH) obtained according to Ex. 2 (—Peptide distribution;—Accumulated weight distribution)

The results appear from FIG. 7. The results are given in terms of weight-and number-average molecular weights, calculated by the following expressions:

$$\overline{M}_w = \frac{\Sigma (A_i \times M_{w,i})}{\Sigma A_i} ;$$

$$\overline{M}_n = \frac{\Sigma A_i}{\Sigma (A_i/M_{w,i})} ;$$

where:

$\overline{M}_w$ = Weight average molecular weight, and $\overline{M}_n$ = Number average molecular weight.

$A_i$ = Area of chromatogram for each segment, measured as the accumulated detector response over each time interval.

$M_{w,i}$ = The corresponding molecular weight for each segment. The value is calculated by means of the calibration curve, using the average elution volume over the time interval.

From these calculations the weight average molecular weight was calculated as 2730, and the number average molecular weight was calculated as 1220, indicating an average peptide length<∞>of 10.3.

Figure 8:
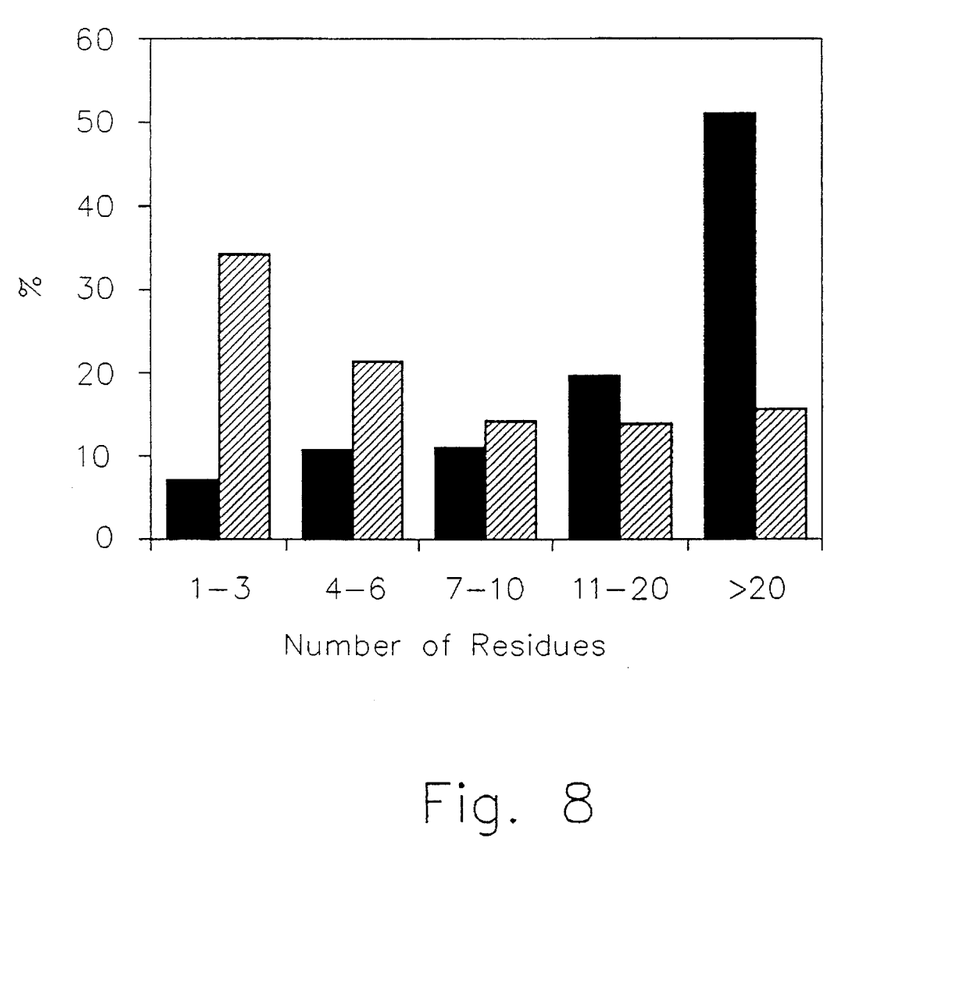
FIG. 8 shows the distribution of peptides of plastein material (6% DH) obtained according to Ex. 2 (■ Distribution by weight; ☐ Distribution by number).

FIG. 8 presents the distribution of peptides by weight and by number.

---

We claim:

1. A method for making plastein material comprising
   (a) adding an enzyme preparation substantially free of subtilisin A activity to the reaction mixture, said reaction mixture comprising a proteinaceous substrate at a concentration of 5–50% (w/w), said enzyme preparation comprising a proteolytic enzyme which:
      (i) is a serine protease specific for glutamic acid and aspartic acid residues;
      (ii) has a specific activity of at least 25 CPU per gram of enzyme protein and an apparent molecular weight of about 23,600;
      (III) is inhibited by diisopropyl phosphofluroridate, but not phenylmethane sulfonylfluoride;
      (iv) and exhibits at least 75% of its maximum activity in the pH range of 6.5–10.0;
      (v) has an N-terminal sequence of SEQ ID NO: 2
   (b) incubating the reaction mixture of step (a) at a temperature of 20°–70° C., and at a pH of 4–12; and
   (c) inactivating said proteolytic enzyme in the reaction mixture of step (b).

2. The method according to claim 1 in which the proteinaceous substrate is casein, soy protein or whey protein.

3. The method according to claim 1 in which the proteinaceous substrate is whey protein or a proteinaceous mixture comprising whey protein.

4. The method according to claim 1 in which the proteinaceous substrate is a proteinaceous mixture comprising whey protein and casein.

5. The method according to claim 1 in which the proteinaceous substrate is a proteinaceous mixture comprising whey protein and soy protein.

6. The method according to claim 1 in which the proteinaceous substrate is a proteinaceous mixture comprising casein and soy protein.

7. The method according to claim 1 in which the proteinaceous substrate is present at a concentration of 5–30% (w/w).

8. The method according to claim 1 in which the proteinaceous substrate is present at a concentration of 5–15% (w/w).

9. The method according to claim 1 in which the proteolytic enzyme is added to the reaction mixture at a concentration of 0.05–50 CPU/100 g protein.

10. The method according to claim 1 in which the proteolytic enzyme is added to the reaction mixture at a concentration of 0.1–25 CPU/100 g protein.

11. The method according to claim 1 in which the proteolytic enzyme is added to the reaction mixture at a concentration of 1–25 CPU/100 g protein.

12. The method according to claim 1 in which the reaction mixture in step (b) is incubated at a temperature of 45°–65° C.

13. The method according to claim 1 in which the reaction mixture in step (b) is incubated at a pH of 6–9.

14. The method according to claim 1 in which the reaction mixture in step (b) is incubated for 0.5–24 hours.

15. The method according to claim 1 in which the reaction mixture in step (b) is incubated for 1–10 hours.

16. The method according to claim 1 in which the reaction mixture in step (b) is incubated for 1–5 hours.

17. The method according to claim 1 which further comprises adding at least one amino acid to the proteinaceous substrate prior to step (b).

* * * * *

SEQUENCE LISTING ( 1 ) GENERAL INFORMATION:

( i i i ) NUMBER OF SEQUENCES: 2

( 2 ) INFORMATION FOR SEQ ID NO:1:

( i ) SEQUENCE CHARACTERISTICS:
  ( A ) LENGTH: 222 amino acids
  ( B ) TYPE: amino acid
  ( C ) STRANDEDNESS: single
  ( D ) TOPOLOGY: linear  ( i i ) MOLECULE TYPE: protein  ( x i ) SEQUENCE DESCRIPTION: SEQ ID NO:1:

```
Ser Val Ile Gly Ser Asp Asp Arg Thr Arg Val Thr Asn Thr Thr Ala
  1               5                  10                  15

Tyr Pro Tyr Arg Ala Ile Val His Ile Ser Ser Ser Ile Gly Ser Cys
             20                  25                  30

Thr Gly Trp Met Ile Gly Pro Lys Thr Val Ala Thr Ala Gly His Cys
         35                  40                  45

Ile Tyr Asp Thr Ser Ser Gly Ser Phe Ala Gly Thr Ala Thr Val Ser
     50                  55                  60

Pro Gly Arg Asn Gly Thr Ser Tyr Pro Tyr Gly Ser Val Lys Ser Thr
 65                  70                  75                  80

Arg Tyr Phe Ile Pro Ser Gly Trp Arg Ser Gly Asn Thr Asn Tyr Asp
             85                  90                  95

Tyr Gly Ala Ile Glu Leu Ser Glu Pro Ile Gly Asn Thr Val Gly Tyr
            100                 105                 110
```

```
Phe  Gly  Tyr  Ser  Tyr  Thr  Thr  Ser  Ser  Leu  Val  Gly  Thr  Thr  Val  Thr
          115                      120                     125

Ile  Ser  Gly  Tyr  Pro  Gly  Asp  Lys  Thr  Ala  Gly  Thr  Gln  Trp  Gln  His
     130                      135                     140

Ser  Gly  Pro  Ile  Ala  Ile  Ser  Glu  Thr  Tyr  Lys  Leu  Gln  Tyr  Ala  Met
145                      150                     155                          160

Asp  Thr  Tyr  Gly  Gly  Gln  Ser  Gly  Ser  Pro  Val  Phe  Glu  Gln  Ser  Ser
                    165                      170                          175

Ser  Arg  Thr  Asn  Cys  Ser  Gly  Pro  Cys  Ser  Leu  Ala  Val  His  Thr  Asn
               180                      185                     190

Gly  Val  Tyr  Gly  Gly  Ser  Ser  Tyr  Asn  Arg  Gly  Thr  Arg  Ile  Thr  Lys
          195                      200                     205

Glu  Val  Phe  Asp  Asn  Leu  Thr  Asn  Trp  Lys  Asn  Ser  Ala  Gln
     210                      215                     220
```

(2) INFORMATION FOR SEQ ID NO:2:

(i) SEQUENCE CHARACTERISTICS:
      (A) LENGTH: 20 amino acids
      (B) TYPE: amino acid
      (C) STRANDEDNESS: single
      (D) TOPOLOGY: linear    (ii) MOLECULE TYPE: protein    (xi) SEQUENCE DESCRIPTION: SEQ ID NO:2:

```
Ser  Val  Ile  Gly  Ser  Asp  Asp  Arg  Thr  Arg  Val  Thr  Asn  Thr  Thr  Ala
1               5                      10                     15

Tyr  Met  Thr  Arg
               20
```